(12) United States Patent
Alexander et al.

(10) Patent No.: US 11,144,653 B2
(45) Date of Patent: Oct. 12, 2021

(54) NETWORK COMMUNICATION STACK FOR DATABASE CONTROL AND RESOURCE PLANNING

(71) Applicant: Accenture Global Solutions Limited, Dublin (IE)

(72) Inventors: Simon Alexander, Bangalore (IN); Paul Bendix Kollannur Sebastian, Bengaluru (IN); Joy Kurian, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 590 days.

(21) Appl. No.: 15/295,186

(22) Filed: Oct. 17, 2016

(65) Prior Publication Data
US 2018/0053007 A1    Feb. 22, 2018

(30) Foreign Application Priority Data
Aug. 22, 2016   (IN) .............................. 201641028523

(51) Int. Cl.
*G06F 16/23*   (2019.01)
*G06F 21/60*   (2013.01)
(Continued)

(52) U.S. Cl.
CPC ........ *G06F 21/604* (2013.01); *G06F 16/2365* (2019.01); *G06F 16/2379* (2019.01);
(Continued)

(58) Field of Classification Search
CPC .. G06F 21/604; G06F 16/2379; G06F 16/245; G06F 16/2365; G06F 21/6218; G06F 21/6227; H04L 63/102
See application file for complete search history.

(56) References Cited

U.S. PATENT DOCUMENTS 6,058,413 A  *  5/2000  Flores ....................... G06F 8/20
                                                              718/101
7,062,502 B1     6/2006  Kesler
(Continued)

OTHER PUBLICATIONS

Examination Report to Australian Application No. 2017203058 dated Oct. 17, 2017, 6p.
(Continued)

*Primary Examiner* — Vaishali Shah
(74) *Attorney, Agent, or Firm* — Brinks Gilson & Lione (57) ABSTRACT

A network communication stack running on relational processing circuitry performs control and maintenance actions on records from a database server managed by repository control circuitry. The database interaction layer of the communication stack accesses the records on the database server. The database interaction layer passes the accessed records to the data processing layer for parsing and storage as tabular entries. An operator may perform manipulations on the tabular entries using a command interface generated by the command layer of the communication stack using locally-defined interface parameters that are independent of characteristics of the database server. The data processing layer recompiles manipulated entries into an altered record. The database interaction layer sends the altered record back to the database server.

20 Claims, 6 Drawing Sheets

(51) Int. Cl.
*G06F 16/245* (2019.01)
*H04L 29/06* (2006.01)
*G06F 21/62* (2013.01)
*H04L 29/08* (2006.01)

(52) U.S. Cl.
CPC ........ *G06F 16/245* (2019.01); *G06F 21/6218* (2013.01); *G06F 21/6227* (2013.01); *H04L 63/102* (2013.01); *G06F 2221/2125* (2013.01); *H04L 63/08* (2013.01); *H04L 67/141* (2013.01)

(56) References Cited

U.S. PATENT DOCUMENTS

| | | | |
|---|---|---|---|
| 7,191,404 | B2 | 3/2007 | Barker et al. |
| 8,844,028 | B1 | 9/2014 | Cheng |
| 2004/0073565 | A1* | 4/2004 | Kaufman ............... G06F 16/252 |
| 2007/0174183 | A1* | 7/2007 | Jung .................... G06Q 40/025 |
| | | | 705/38 |
| 2012/0016851 | A1* | 1/2012 | Hrle .................... G06F 16/2246 |
| | | | 707/696 |
| 2012/0124163 | A1* | 5/2012 | Carter .................... G06Q 30/06 |
| | | | 709/217 |
| 2014/0298243 | A1 | 10/2014 | Le et al. |
| 2016/0125317 | A1* | 5/2016 | Benjamin .............. G06Q 30/02 |
| | | | 706/12 |
| 2017/0353531 | A1* | 12/2017 | Conn .................. H04L 67/2861 |
| 2018/0046779 | A1* | 2/2018 | Millen .................. G16H 10/20 |

OTHER PUBLICATIONS

Office Action in India Application No. 201641028523, dated Mar. 17, 2020, 7 pages.

* cited by examiner

NETWORK COMMUNICATION STACK FOR DATABASE CONTROL AND RESOURCE PLANNING

PRIORITY CLAIM

This application claims priority to Indian patent application number 201641028523, filed 22 Aug. 2016, entitled Network Communication Stack for Database Control and Resource Planning, which is entirely incorporated by reference.

TECHNICAL FIELD

This disclosure relates to multiple host database control and entry via a multiple layer communication stack.

BACKGROUND

Rapid advances in communications and storage technologies, driven by immense customer demand, have resulted in widespread adoption of data centers and cloud systems for managing large data payloads and record systems. As one example, modern enterprise systems maintain data records many terabytes in size. Improvements in communication and storage protocols will further enhance the capabilities of data record management systems.

DETAILED DESCRIPTION

In various communications systems, a client may connect to a host and execute, initiate, or cause execution of management and maintenance tasks on the host system. For example, a communications stack executing on relational processing circuitry of the client system may connect to a host database server and alter, delete, generate, update, or otherwise control records stored on the host database server. In some implementations, repository control circuitry may act as a gateway for one or more database servers and manage access and transfer privileges for the database servers.

In some cases, the client system may have authorization to engage in management and maintenance tasks on multiple host systems. The multiple host systems may grant the client differing levels of access privileges. Further, the multiple host systems may have differing underlying database characteristics such as, operating system type, customer relationship management (CRM) software type, supply chain management (SCM) software type, enterprise resource planning (ERP) software type, allowed connections, or other database characteristics.

In some cases, client system may maintain multiple different client interfaces to connect to the multiple host systems with differing access privilege levels and database characteristics. Accordingly, operators may be trained to use each of the multiple different client interfaces, each of which may entail significant training investment.

In some implementations, the client systems may execute a multiple layer communication stack that provides a consistent interface regardless of the database characteristics of the host system. For example, the positioning of fields for record editing, locations of menu options, available actions, or other interface elements may be held constant for multiple hosts with differing database characteristics. Accordingly, use of a multiple layer communication stack that provides a consistent interface for operation may allow operators to engage in management and maintenance tasks after undergoing training on a single client interface.

In an example scenario, the communication stack may be used to implement a neutral ERP Interface through a standard operator console that provides the ability to trigger functions in remote host systems within a client platform. The neutral ERP interface may use the communication state to establish flexible interconnectivity that caters to varying security needs, and to robust data models that accommodate varying data formats across business domains and client business processes.

Figure 1:
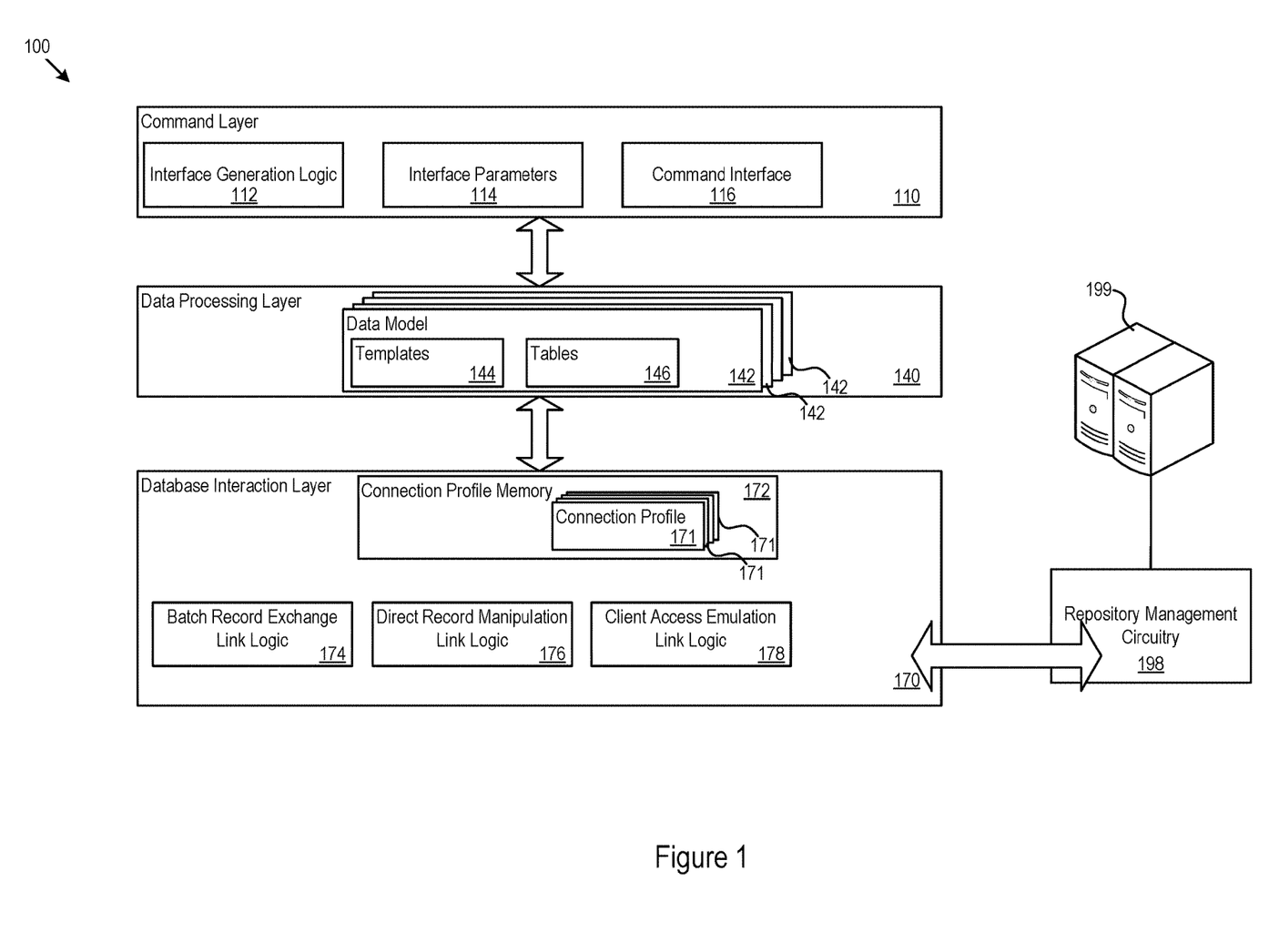
FIG. 1 shows an example multiple layer communication stack.

FIG. 1 shows an example multiple layer communication stack 100. In this example, the multiple layer communication stack 100 includes a command layer 110, a data processing layer 140, and a database interaction layer 170.

The command layer 110 may include interface generation logic 112 which may access locally-defined interface parameters 114 to determine layout, positioning, and operational features of a command interface 116 for operator interaction. The command layer 110 may present the generated command interface 116 on a display for viewing by the operator and accept input from human interface devices (HIDs), for example, touch screens, mice, keyboards, trackpads, or other HIDs.

The command layer 110 may present features such as database searching, which may allow for localized searching of cached content within the data processing layer, searching of records stored on the host database server, or both. Further, the command layer may initiate optical character recognition (OCR) of documents accessed or received by the communication stack. For example, documentation of a portion of a transaction, such as, a packing slip or shipping manifest, may be OCR'd and stored in tabular entries at the data processing layer.

The user interface 116 may include drop-down menus, buttons, input fields, display fields, or other interactive interface objects. The interactive interface objects may be used to initiate execution of the features discussed herein.

Figure 2:
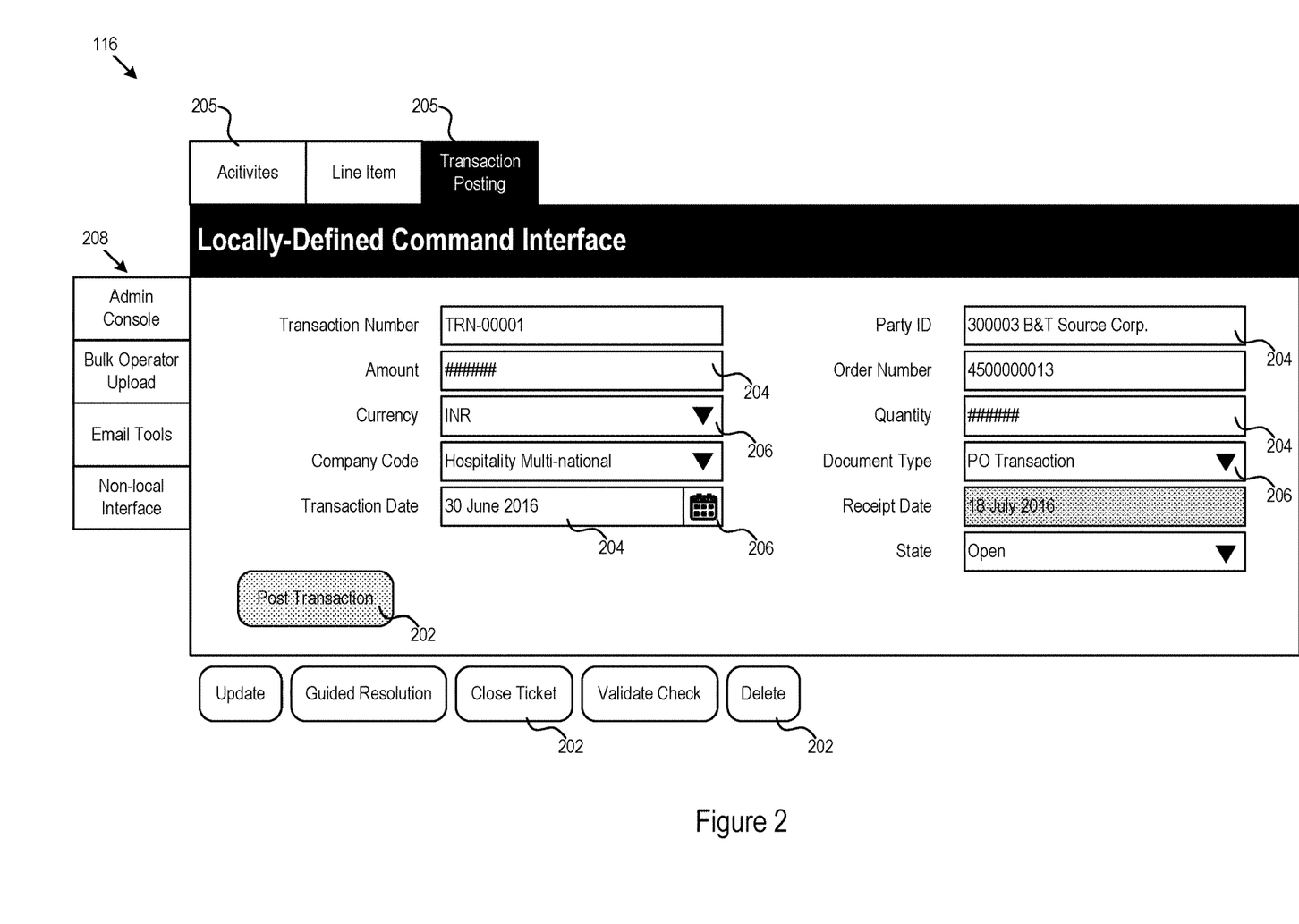
FIG. 2 shows an example user interface.

FIG. 2 shows an example user interface 116. The example user interface includes buttons 202, fields 204, tabs 205, and dropdown menus 206. The user interface 116 may further include side menus 208 for additional options and integration with other applications. For example, in some cases, the operator may access a non-locally-defined interface for interaction with a database server, such as the native interface of the database server system. The positioning and operation of the interface components may be determined using locally-defined interface parameters instead of relying on the database server characteristics to determine the overall appearance and operation of the user interface 116.

In the example user interface 116 the interface is in an invoice posting tab 205. The different tabs may have different locally-defined layouts to support different activities.

Referring again to FIG. 1, the data processing layer 140 may include one or more data models 142. The data models 142 may include templates 144 for parsing received data from incoming transaction records into tables 146 for local manipulation by the system at the command layer. The tabular entries within the tables may be provided to the command layer to populate fields. In some cases, input from the command layer 110 may be written as updates to the tabular entries or for the basis for generation of new tabular entries. The tabular entries may be related to the transaction referenced by the original record received from a database server. In some cases, when a tabular entry is generated in response to a record from a database entry, for example, by parsing the database record or as a result of processing other tabular records parse from a database record, the system may determine that the tabular entry is related to the transaction referenced by the database record.

In an example scenario, the database interaction layer 170 may communicate with the database server 199 and in response receive data from transaction records via the repository control circuitry 198. The data from the incoming records may be received in a format selected for compatibility with the database server. For example, the data may be received in a "comma separated value" (CSV) format or other database entry format. The CSV records may be parsed by the data processing layer 140 to generate tables amenable to local manipulation. The record format for the particular database server may be identified within a connection profile 171 for the database server. In some implementations, the communications stack may accept multiple record formats to facilitate connectivity with multiple different database servers.

When sending data back to the database server, the data processing layer 140 may use the data models 142 to invert the parsing process. The altered or newly generated tabular entries may be compiled into the format selected for the database server 199 to generate an outgoing data record. For example, compilation of tabular entries may include inverting the parsing process of the data models. For example, particular fields in the tabular entries may be placed in predetermined positions in a CSV file. The positions may be determined based on the field designations in the data models. The complied outgoing record may then be passed to the database interaction layer 170 for transfer back to the database server 199 via the repository control circuitry 198.

The database interaction layer 170 may include connection profile memory 172, which may store connection profiles 171 for one or more database servers. The connection profiles 171 may include security credentials for accessing an account allowing records maintenance and management on the database servers. Further, the connection profiles 171 may include an indication of a link type for establishment of a communication link to the database server 199 via the repository control circuitry 198. The link type may be consistent with the authorization level that may be granted in accord with the stored security credentials.

In various implementations, the database interaction layer 170 may include logic to support multiple link types. For example, the interaction layer 170 may include batch record exchange link logic 174, direct record manipulation link logic 176, and client access emulation link logic 176.

The batch record exchange link logic 174 may operate by exchanging records in bulk at various intervals. The intervals of exchange may be hourly, daily, weekly, other periodicity, upon command, at irregular intervals, when designated by an operation, or at other intervals. Because a period may pass between exchanges with the database server, the batch record exchange link logic 174 may exchange multiple records, for example a batch of records, with the database server in a single transfer session. Thus, the communication stack 100 may cache the records it may use in between successive exchanges with the database server. In some cases, the communication stack 100 may locally mirror the database server in its entirety or in part to allow flexibility in which records are used between the exchanges. For example, the communication stack 100 may mirror the database server in part by mirroring records for open or incomplete transactions. Additionally or alternatively, the communication stack 100 may mirror the database server in part by mirroring records within a defined age range, scheduled to undergo activity within a determined time window, or other timeframe for the database server records. Mirroring the database server may include copying records in local storage for manipulation or management. Local storage may include any storage accessible to the data processing layer 140 of the communication stack for read/write operations regardless of physical proximity to any particular hardware.

In some implementations, the batch record exchange with the database server may be performed over a secure file transfer protocol (sFTP) channel. The sFTP channel may include FTP transfers using a secure socket layer connection. The stored connection profile 171 for the database server may include credentials such as a certificate or username-password pair to support establishment of the sFTP channel with the database server.

The direct record manipulation link logic 176 may operate by opening a link that allows the database interaction layer to make changes to records while the records are stored on the database server.

In some implementations, the direct record manipulation link logic 176 may access the records on the database server through application programming interface (API) functions supported by the database server. Accordingly, in some cases, the direct record manipulation link logic 176 may interact with the database server at lower layer of operation than the batch record exchange link logic 174. The batch record exchange link logic 174 may be reliant on the database server to merge changes by the communications stack 100 into the database server's records. The client emulation link logic 178 may be used for connections where the database interaction layer interacts with a client interface of database server that is designed for operator interaction instead of machine-to-machine communications. In an example scenario, the client interface may include a web portal for the database server. In the example scenario, the client emulation link logic 178 may translate the management or maintenance operations selected at the command layer into one or more interface inputs for the web portal. For example, this may include actions to: populate fields of the web portal, confirm inputs, upload files, download records, or other web portal activities. The connection profile 171 may include instructions, such as screen mappings between the command layer interface layout and the client interface, for translation of various maintenance and management functions at the command layer to actions for client interface interaction by the client emulation link logic 178. In some cases, the client emulation link logic 178 may support robotic process automation (RPA). RPA may include technologies that allow operators of the communication stack to configure logic, e.g., software and hardware, as a "robot" to capture and interpret existing applications for processing a transaction, manipulating data, triggering responses and communicating with other digital systems.

The communication stack—the command layer 110, the data processing layer 140, and the database interaction layer 170—improves the functioning of the underlying computer hardware itself. That is, these features (among others described below) are specific improvements in way that the underlying system operates. The improvements facilitate more efficient, accurate, and precise execution of complex resource analysis.

Figure 3:
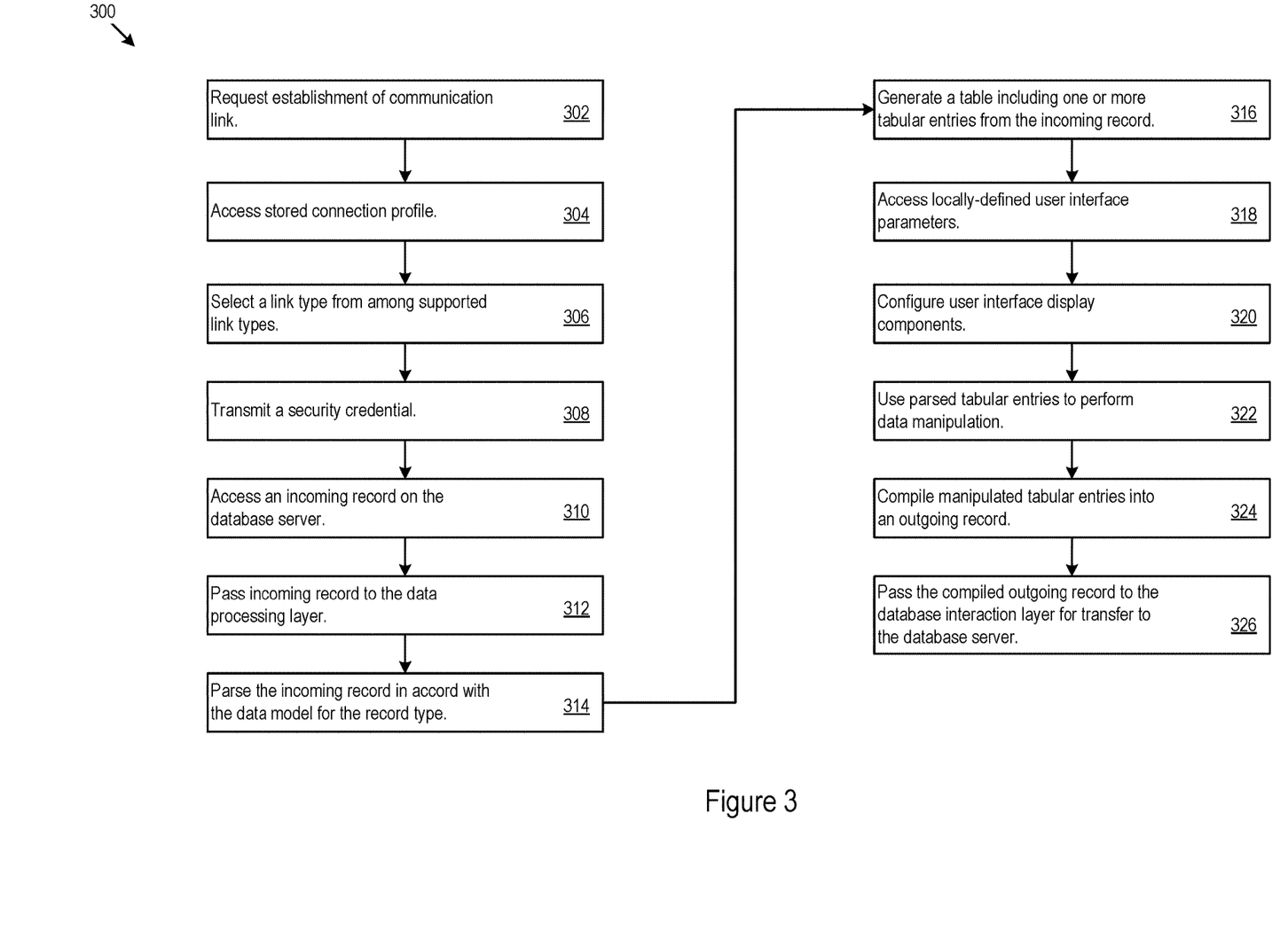
FIG. 3 shows communication stack logic.

Referring now to FIG. 3, communication stack logic (CSML) 300 is shown. The database interaction layer 170 may request establishment of a communication link between repository control circuitry 198 and the relational processing circuitry on which the communication stack is executing (302). To establish the communication link, the database interaction layer may access a stored connection profile for the database server (304). The connection profile may include an indication of the link type or types supported by the database server. The connection profile may further include security credentials to support connection to the database server. Responsive to the connection profile, the database interaction layer may select a link type from among the link types supported by the relational processing circuitry (306). In some cases, the available link types may include batch record exchange, direct record manipulation, and client access emulation. In some cases, multiple link types may be used simultaneously. For example, incoming records may be received through batch record exchange while outgoing records are handled through direct record manipulation, client access emulation, or another link type. In some cases, to support the data processing layer 140, many records may be mirrored in local storage. Hence, the many incoming records may be handled in a batch transaction, while individually changed outgoing records may be uploaded to the database server through another link type. Accordingly, the connection profile for a database server may specify a link type for incoming records and a link type for outgoing records.

The database interaction layer 170 may transmit a security credential for the database server 199 to the repository control circuitry 198 (308). In various implementations, the security credential may include passwords, certificates, or other account verification information. In response to the security credential, the database interaction layer may receive an indication of authorization to establish the communication in accord with the selected link type. In some implementations, the received indication may include a message acknowledging a successful authorization. Additionally or alternatively, the received indication may be inferred from a lack of a negative acknowledgement of an authorization failure within a predetermined window, while no specific acknowledgement is received. In some cases, the received indication may include the repository control circuitry proceeding to take one or more actions to setup the communication link.

Once the communication link is established, the database interaction layer 170 may access an incoming record from the database server (310). The database interaction layer may pass the incoming record to the data processing layer (312). The data processing layer 140 may parse the incoming record in accord with the data model for the record type of the incoming record (314). In some cases, the record type of a record may be determined in response to type of transaction that the record describes. Through the parsing process, the data processing layer 140 may generate a table including one or more tabular entries from the incoming record (316). As a result, the data processing layer improves the storage functionality of the computer hardware.

The command layer 110 may generate a user interface display for operator interaction. To generate the user interface display, the command layer may access one or more locally-defined user interface parameters (318). The locally-defined parameters may include aesthetic and operational preferences for the user interface. The preferences may be defined independently of the characteristics of the database server with which the communication stack has established the communication link. Accordingly, the user interface look, feel, and operation may be independent of the corresponding look, feel, or operation associated with the characteristics of the database server. For example, the database server may use a particular CRM, ERP, or SCM platform. However, in some cases, the user interface of the command layer may be consistent across the diversity of platforms. Accordingly, an operator may be able to use the diversity of platforms after training on user interface without necessarily training on each of the diversity of platforms. Accordingly, the command layer 110 improves the usability, a component of the total functionality of a computer system, of the underlying hardware.

In response to the locally-defined parameters, the command layer 110 may configure one or more user interface display components, such as fields, menus, buttons, or other components (320). The command layer may use the parsed tabular entries to populate the user interface display components with data. The command layer 110 may receive operator instructions, for example from HID interaction with the user interface display components, to perform a manipulation of the data (322). For example, manipulations may include: validating one entry in reference to another entry, creating a new entry, altering an entry, deleting an entry, searching entries, determining that an entry is related to a given transaction, or other data manipulations. After the data manipulation is performed, the command layer 110 may instruct the data processing layer 140 to compile the manipulated tabular entry, or multiple entries related to a single transaction, into an outgoing record (324). The validation of one tabular entry against another tabular entry may include comparing values in corresponding fields. For example, a transaction date field from a first tabular may be compared to a transaction date from a second tabular entry, for example, to ensure the tabular entries refer to the same transaction or to ensure that the tabular entries are consistent and therefore valid. If the tabular entries are consistent, the command layer 110 may indicate that they are valid for example by marking the tabular entries as valid, marking the transaction as resolved, or other indications. Marking the transaction or tabular entries may include setting a resolution flag in a tabular entry, updating a resolution field in a tabular entry or database record, or other marking. If the tabular entries are inconsistent, the command layer 110 may indicate that they are not valid. Accordingly, an operator may be alerted of the inconsistency and resolution may be requested. Comparisons of field values may include, string comparisons, bitwise comparisons, contextual comparisons, or other content comparisons. The data processing layer 140 may pass the compiled outgoing record to the database interaction layer 170 for transfer to the database server 199 via the repository control circuitry 198 (326).

Figure 4:
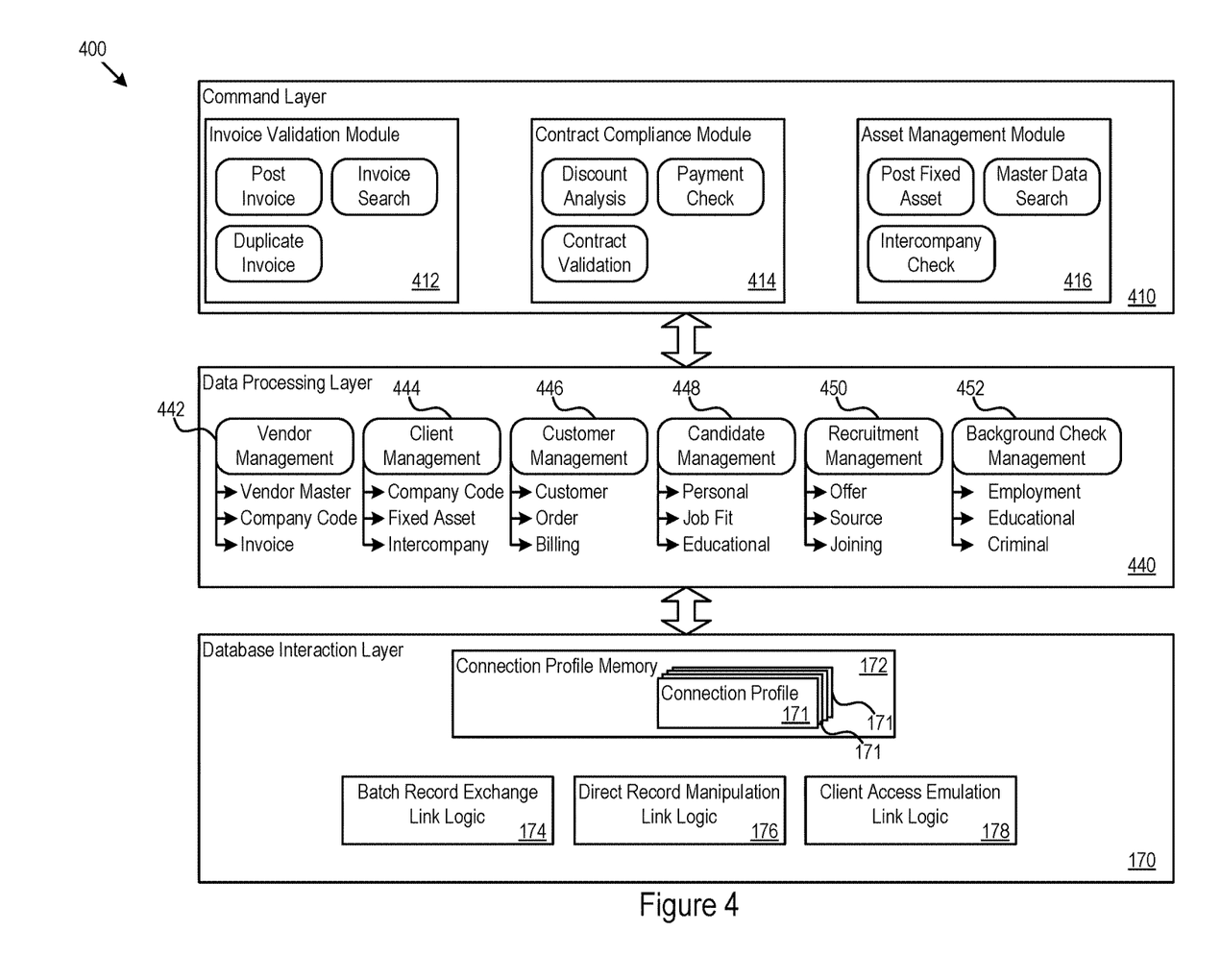
FIG. 4 shows an example communication stack.

FIG. 4 shows an example communication stack 400. In the example communication stack, the command layer 410 includes multiple modules 412, 414, and 416. The modules may be used to support one or more transactions, such as invoice validation 412, contract compliance 414, and asset management 416.

The data processing layer 440 may include multiple data models 442, 444, 446, 448, 450, 452 for various record types including vendor management 442, client management 444, customer management 446, candidate management 448, recruitment coordination 450, and background check management 452.

As discussed above, with respect the example communication stack of FIG. 1, the database interaction layer 170 may include batch record exchange link logic 174, direct record manipulation link logic 176, and client access emulation link logic 176. In the example communication stack 170, cloud based client emulation platforms, such as Automation Anywhere, Blueprism, Fusion, or other cloud based client emulation platforms may be used to interact with the database servers.

Figure 5:
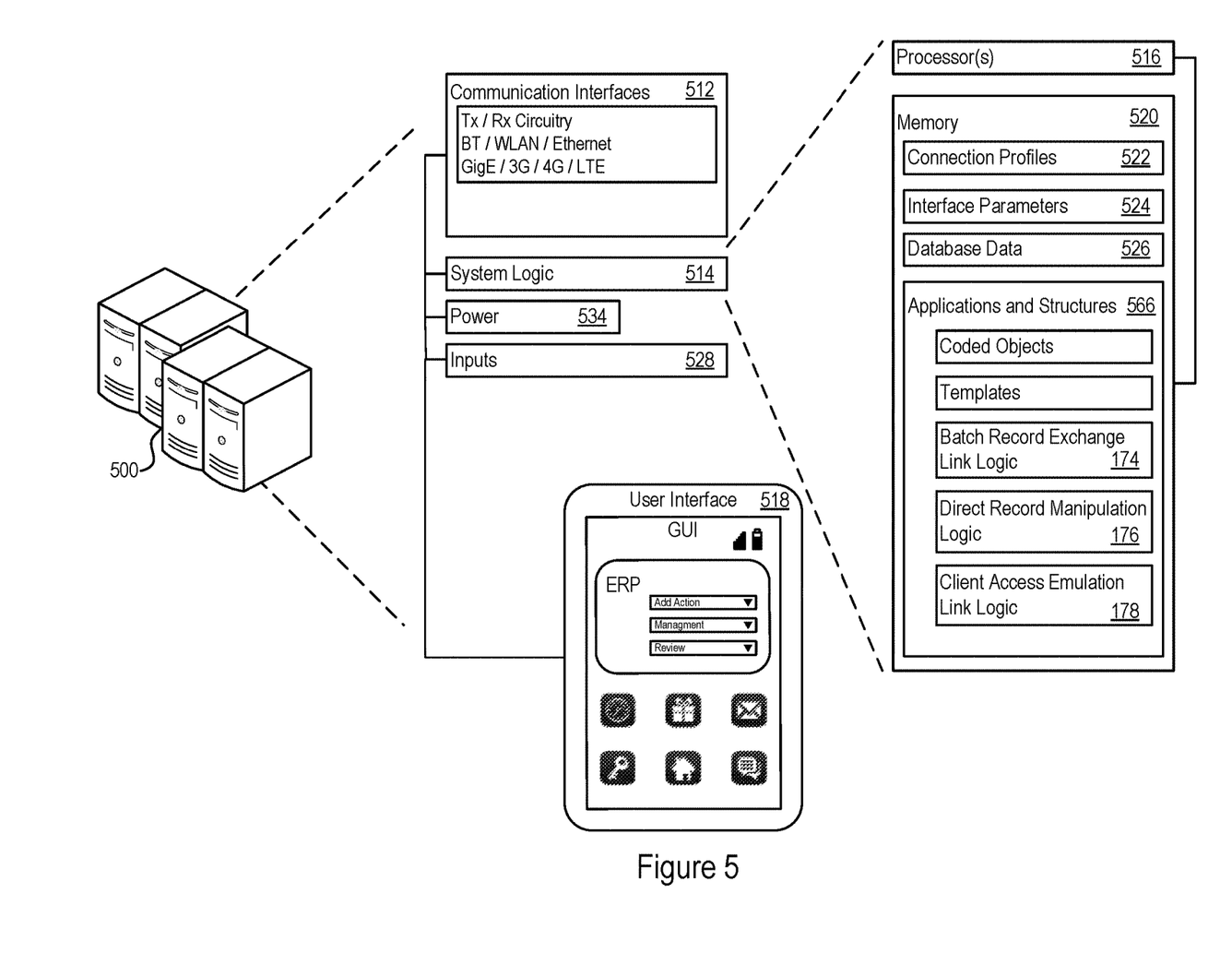
FIG. 5 shows an example specific execution environment for the communication stack.

FIG. 5 shows an example specific execution environment 500 for the communication stack described above. The execution environment 500 may include system logic 514 to support execution of the multiple layers of the communication stack described above. The system logic may include processors 516, memory 520, and/or other circuitry.

The memory 520 may be used to store the data models, connection profiles 522, locally-defined interface parameters 524, and locally-mirrored database data 526, as described above. In some cases, the memory 520, for example memory used for the locally-mirrored database data, may be implemented using a relational database management system (RDMS). The memory may further include applications and structures 566, for example, coded objects, templates, or other structures to support data analysis, transaction validation, record parsing and compiling, and/or other record management and maintenance. The applications and structures may include the batch record exchange link logic 174, direct record manipulation link logic 176, client access emulation link logic 178, and stack layer instructions.

The execution environment 500 may also include commutation interfaces 512, which may support wireless, e.g. Bluetooth, Wi-Fi, WLAN, cellular (4G, LTE/A), and/or wired, Ethernet, Gigabit Ethernet, optical networking protocols. The communication interface may support communication with repository control circuitry using one or more link types. The execution environment 500 may include power functions 534 and various input interfaces 528. The execution environment may also include a user interface 518 that may include human interface devices and/or graphical user interfaces (GUI). The GUI may be used to present the user interface display to an operator after generation in accord with the locally-defined user interface parameters. In various implementations, the system logic 514 may be distributed over multiple physical servers and/or be implemented as a virtual machine.

In some cases the execution environment 500 may be a specially-defined computational system deployed in a cloud platform. In some cases, the parameters defining the execution environment may be specified in a manifest for cloud deployment. The manifest may be used by an operator to requisition cloud base hardware resources, which serve as the relational processing circuitry, and then deploy the software components, for example the communication stack, of the execution environment onto the hardware resources. In some cases, a manifest may be stored as a preference file such as a YAML (yet another mark-up language), .JSON, or other preference file type.

Figure 6:
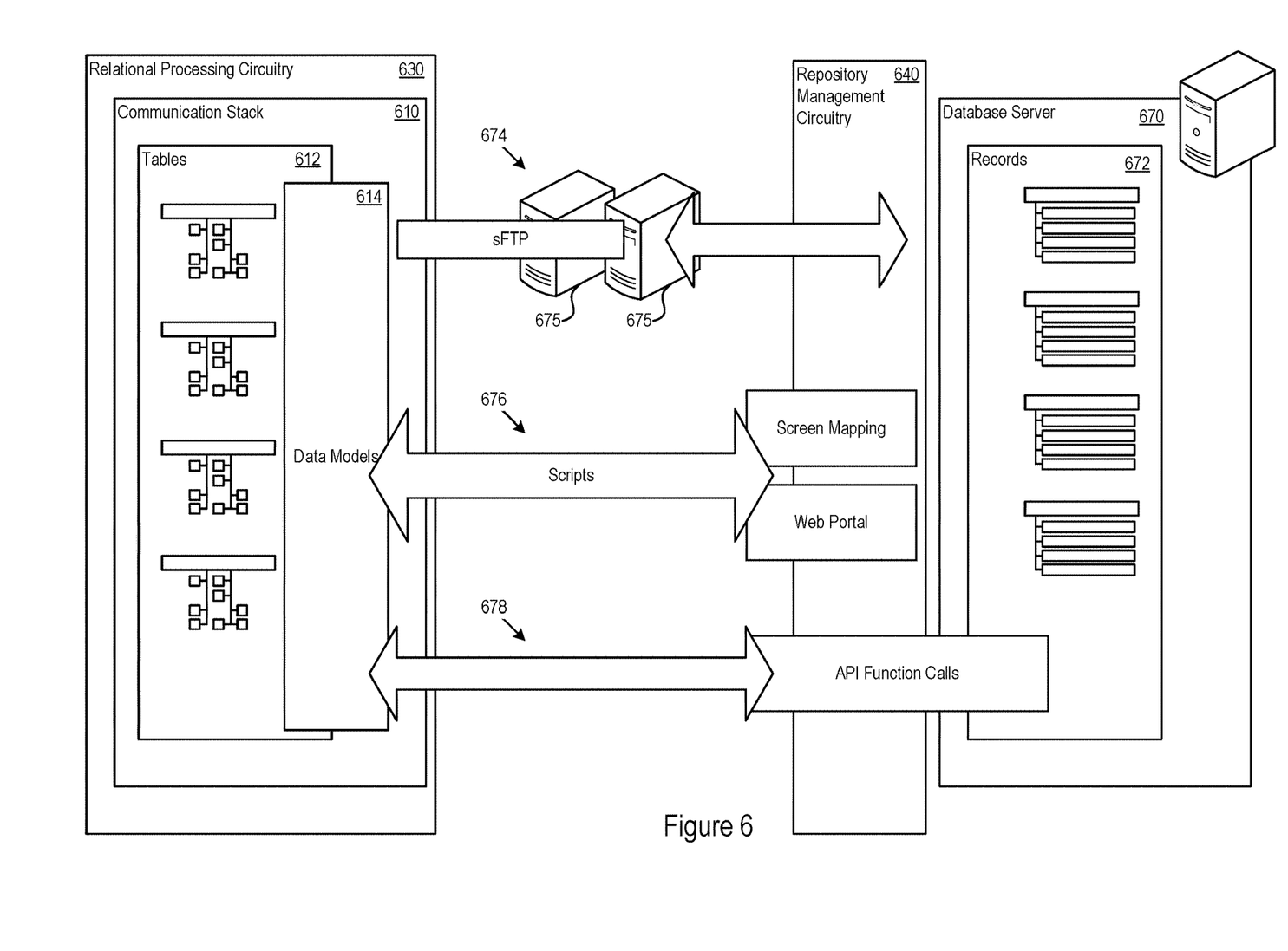
FIG. 6 shows example interaction between a communication stack running on relational processing circuitry and repository control circuitry managing a database server.

FIG. 6 shows example interactions between a communication stack 610 running on relational processing circuitry 630 and repository control circuitry 640 managing a database server 670 that stores records 672. The communication stack 610 may maintain multiple tables 612 locally in a memory system within the data processing layer. For batch record exchange via sFTP 674, the communication stack 610 may interact with multiple sFTP servers 675, which may be maintained for exchange by the database server operators. Transferred records to and from the database server may be translated or parsed using the data models 614.

For client access emulation 676, the communication stack 610 may execute scripts generated using the data models 614 to translate changes made to tabular entries into user interface interaction to effectuate the changes to the records on the database server. In some cases, scripts may be used to support data transfers since the format of the data received from different client systems may not necessarily be standard. Accordingly, scripts that execute data transformations of various received formats in one or more native formats may be used to allow the system to accept the multiple formats of the client systems. Additionally or alternatively, data validations being performed, for example in accord with operational rules, may be used to ensure data integrity. For example, if data is received by the upper layers of the communication stack from a particular system in a non-native format, for example, a format on which the system cannot perform data manipulation actions, operational rules may be invoked to execute an error handling routine that may run diagnostics on the data processing layer to determine why the data was not converted prior to being made available to the upper layers. For example, the operational rules may determine that the data processing layer may be improperly identifying database file types.

In various implementations, scripts may be stored within the memory 520 of the execution environment described above. In some cases, cloud-based or distributed storage solutions may be implemented for script storage.

For direct record manipulation 678, the communication stack 610 directly controls the content of the database server 670. In one implementation, the communication stack 610 achieves direct control by calling API functions of an access API defined by the database server 670.

In various implementations, Client access emulation and direct record manipulation may use simple object access protocol to implement transfers with database servers. However, in some implementations, other XML-based messaging protocols for exchanging information may be used by the communication stack. Additionally or alternatively, Representational State Transfer (REST) network architecture may be used. The REST architecture may use a stateless, client-server, cacheable communications protocol. In an example scenario, a REST architecture may be used by the system in conjunction with a HTTP protocol.

For the various connection types various ports may be used. The port numbers designated for various networking tasks may vary based on integration architecture that is determined based on the architecture of the client system. In an example scenario, Port 443 may be used by client access emulation or direct record manipulation to support HTTP over SSL (secure socket layer). In an example scenario, Port 22 may be used to carry a SFTP session over a SSH tunnel between the relational processing circuitry 630 and repository control circuitry 640.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method comprising:
    requesting establishment of a communication link between repository control circuitry and relational processing circuitry, the repository control circuitry in communication with a database server, where requesting includes:
        transmitting, from a database interaction layer of a communication service stack executing on the relational processing circuitry, a security credential identifying the relational processing circuitry with a management account with access privileges for the database server; and
        based on the access privileges, determining to handle incoming records via batch record access and outgoing records via a client emulation link in accord with a particular customer relationship management (CRM) platform, supply chain management (SCM) platform, or enterprise resource planning (ERP) platform used by the database server;
    receiving an indication of authorization to access the database server from the repository control circuitry;
    after the communication link is established, accessing, via the batch record access at the database interaction layer, an incoming record stored on the database server via the repository control circuitry;
    passing the incoming record from the database interaction layer to a data processing layer of the communication service stack executing on the relational processing circuitry;
    at the data processing layer, parsing the record into a tabular entry;
    at a command layer of the communication service stack executing on the relational processing circuitry:
        accessing a locally-defined interface parameter, the locally-defined interface parameter selected independently of a characteristic of the database server, the characteristic of the database server including an interface appearance corresponding to the particular CRM platform, SCM platform, or ERP platform used by the database server;
        responsive to the locally-defined interface parameter, generating a user interface display on a terminal, the user interface display including a field positioned within the user interface display in accord with the locally-defined interface parameter;
        populating the field using accessed content from the tabular entry; and
        receiving a request to alter the tabular entry via input to the field;
    after altering the tabular entry:
        recompiling, at the data processing layer, the tabular entry into an outgoing record; and
        defining web portal interface input operations to translate the outgoing record into a form compulsory for transmission over the client emulation link to a web portal interface by:
            translating an outgoing record update operation into a series of operator-interface input operations to be performed by automated processing, the translating including generating a screen mapping between the user interface display and the operator-interface relating one or more fields positioned on the user interface display to field position on the web portal interface; and
    sending the outgoing record to the database interaction layer for entry into the database server via the web portal input operations to replace the incoming record on the database server by executing the series of operator-interface input operations via the automated processing.

2. The method of claim 1, where requesting establishment of the communication link further comprises accessing a stored connection profile for the repository control circuitry.

3. The method of claim 2, where the stored connection profile includes the security credential.

4. The method of claim 2, where requesting establishment of the communication link further comprises selecting, responsive to the stored connection profile, a link type from among at least batch record exchange, direct record manipulation, and client access emulation.

5. The method of claim 4, where the stored connection profile includes a batch record exchange schedule to support batch record exchange.

6. The method of claim 1, further comprising accessing a cloud deployment manifest that defines operation of the communication service stack.

7. The method of claim 6, responsive to the cloud deployment manifest, deploying the communication service stack on the relational processing circuitry before requesting establishment of the communication link.

8. The method of claim 1, where parsing the record to generate the tabular entry comprises parsing the record in accord with a data model for a record type of the record.

9. A product comprising:
   a machine-readable medium other than a transitory signal; and
   instructions stored on the machine-readable medium, the instructions, when executed, configured to cause a processor to:
      request establishment of a communication link between repository control circuitry and relational processing circuitry, the repository control circuitry in communication with a database server, by:
         at a database interaction layer of a communication service stack configured to execute on the relational processing circuitry, access a stored connection profile for the repository control circuitry;
         responsive to the stored connection profile, select a link type from among at least batch record exchange, direct record manipulation, and client access emulation;
         transmitting, from the database interaction layer, a security credential that affords the relational processing circuitry access privileges to the database server in accord with the link type; and
         receiving an indication of authorization to establish the communication link in accord with the link type;
      after the communication link is established, access, via the database interaction layer an incoming record for a transaction stored on the database server via the repository control circuitry;
      pass the incoming record from the database interaction layer to a data processing layer of the communication service stack configured to execute on the relational processing circuitry;
      at the data processing layer parse the incoming record to generate a first tabular entry; and
      at a command layer of the communication service stack configured to execute on the relational processing circuitry:
         access a locally-defined interface parameter, the locally-defined interface parameter selected independently of a characteristic of the database server;
         responsive to the locally-defined interface parameter, generate a user interface display on a terminal, the user interface display including a field positioned in accord with the locally-defined interface parameter;
         receive a request to generate a second tabular entry via input to the field;
         determine that the second tabular entry is related to the transaction;
         after generating the second tabular entry, validate the second tabular entry against the first tabular entry by comparing a first transaction date field from the first tabular entry to a second transaction date from the second tabular entry to ensure that that both the first tabular entry and the second tabular entry refer to the transaction;
      at the data processing layer:
         compile the first tabular entry and the second tabular entry into an outgoing record; and
         define web portal interface input operations to translate the outgoing record into a form compulsory for transmission over a client emulation link to a web portal interface by:
            translating an outgoing record update operation into a series of operator-interface input operations to be performed by automated processing, the translating including generating a screen mapping between the user interface display and the operator-interface relating one or more fields positioned on the user interface display to field position on the web portal interface; and
         send the outgoing record to the database interaction layer for provision to the database server to replace the incoming record for the transaction by executing the series of operator-interface input operations via the automated processing.

10. The product of claim 9, where the instructions are further configured to cause the relational processing circuitry to validate the second tabular entry against the first tabular entry responsive to an execution authorization request for the transaction.

11. The product of claim 9, where the instructions are further configured to cause the relational processing circuitry to mark the outgoing record as resolved after validating the second tabular entry against the first tabular entry.

12. The product of claim 9, where the stored connection profile includes the security credential.

13. The product of claim 12, where the stored connection profile includes a batch record exchange schedule to support batch record exchange.

14. The product of claim 9, where the instructions are further configured to cause the relational processing circuitry to parse the record to generate the first tabular entry by parsing the record in accord with a data model for a record type of the record.

15. A method including:
    requesting establishment of a communication link between repository control circuitry and relational processing circuitry, the repository control circuitry in communication with a database server, by:
       at a database interaction layer of a communication service stack configured to execute on the relational processing circuitry, accessing a stored connection profile for the repository control circuitry;
       responsive to the stored connection profile, selecting link types for incoming and outgoing transactions from among at least batch record exchange, direct record manipulation, and client access emulation, where batch record exchange is selected for incoming transactions, and client access emulation in accord with a particular customer relationship management (CRM) platform, supply chain management (SCM) platform, or enterprise resource planning (ERP) platform used by the database server is selected for outgoing transactions;
       transmitting, from the database interaction layer, a security credential that affords the relational processing circuitry access privileges to the database server in accord with the link type; and
    receiving an indication of authorization to establish the communication link in accord with the link type;

after the communication link is established, accessing, via the database interaction layer an incoming record for a transaction stored on the database server via the repository control circuitry;

passing the incoming record from the database interaction layer to a data processing layer of the communication service stack configured to execute on the relational processing circuitry;

at the data processing layer parsing the incoming record to generate a first tabular entry; and at a command layer of the communication service stack executing on the relational processing circuitry:
   accessing a locally-defined interface parameter, the locally-defined interface parameter selected independently of a characteristic of the database server, the characteristic of the database server including an interface appearance corresponding to a particular customer relationship management (CRM) platform, supply chain management (SCM) platform, or enterprise resource planning (ERP) platform used by the database server;
   responsive to the locally-defined interface parameter, generating a user interface display on a terminal, the user interface display including a field positioned in accord with the locally-defined interface parameter;
   receiving a request to generate a second tabular entry via input to the field;
   determining that the second tabular entry is related to the transaction;
   after generating the second tabular entry, validating the second tabular entry against the first tabular entry by comparing a first transaction date field from the first tabular entry to a second transaction date from the second tabular entry to ensure that that both the first tabular entry and the second tabular entry refer to the transaction;

at the data processing layer:
   compiling the first tabular entry and the second tabular entry into an outgoing record; and
   defining web portal interface input operations to translate the outgoing record into a form compulsory for transmission over the client emulation link to a web portal interface by:
      translating an outgoing record update operation into a series of operator-interface input operations to be performed by automated processing, the translating including generating a screen mapping between the user interface display and the operator-interface relating one or more fields positioned on the user interface display to field position on the web portal interface; and
   sending the outgoing record to the database interaction layer for provision to the database server to replace the incoming record for the transaction by executing the series of operator-interface input operations via the automated processing.

16. The method of claim 15, where validating the second tabular entry against the first tabular entry includes validating the second tabular entry against the first tabular entry responsive to an execution authorization request for the transaction.

17. The method of claim 15, further including, at the relational processing circuitry, marking the outgoing record as resolved after validating the second tabular entry against the first tabular entry.

18. The method of claim 15, where the stored connection profile includes the security credential.

19. The method of claim 18, where the stored connection profile includes a batch record exchange schedule to support batch record exchange.

20. The method of claim 15, where parsing the record to generate the first tabular entry includes parsing the record in accord with a data model for a record type of the record.

* * * * *